United States Patent [19] [11] 4,162,024
Shanley [45] Jul. 24, 1979

[54] CONTAINER HAVING SLIDEABLE CLOSURE MEANS

[76] Inventor: John P. Shanley, 311 N. Dunton Ave., Arlington Heights, Ill. 60004

[21] Appl. No.: 909,549

[22] Filed: May 25, 1978

[51] Int. Cl.$^2$ ............................................. B65D 43/20
[52] U.S. Cl. ................................... 220/350; 206/816; 217/62
[58] Field of Search ....................... 220/350; 206/816; 217/62, 63; 312/297

[56] References Cited

U.S. PATENT DOCUMENTS

| 2,107,997 | 2/1938 | Horsley | 206/816 X |
| 2,690,216 | 9/1954 | Scott | 220/350 |

Primary Examiner—George T. Hall
Attorney, Agent, or Firm—Fitch, Even & Tabin

[57] ABSTRACT

A storage container is disclosed for items, such as tabulating cards, magnetic cards, magentic tape cassettes as well as smaller items. The container comprises an integrally formed tray to which container side panels are attached. Each of the side panels is larger than the side walls of the tray and contain a channel along the periphery for receiving a sliding closure means therein for closing the container. A second removable tray of substantially identical outer proportions as the first tray can be placed within the container above the first tray and can be seated on horizontal flanges integrally formed with the side panels. The flanges additionally impart structural rigidity to the container and have a number of notches for receiving members that divide the lower tray portion into compartments. The closure member has spaced transverse ribs bonded to a flexible fabriclike substrate.

15 Claims, 9 Drawing Figures

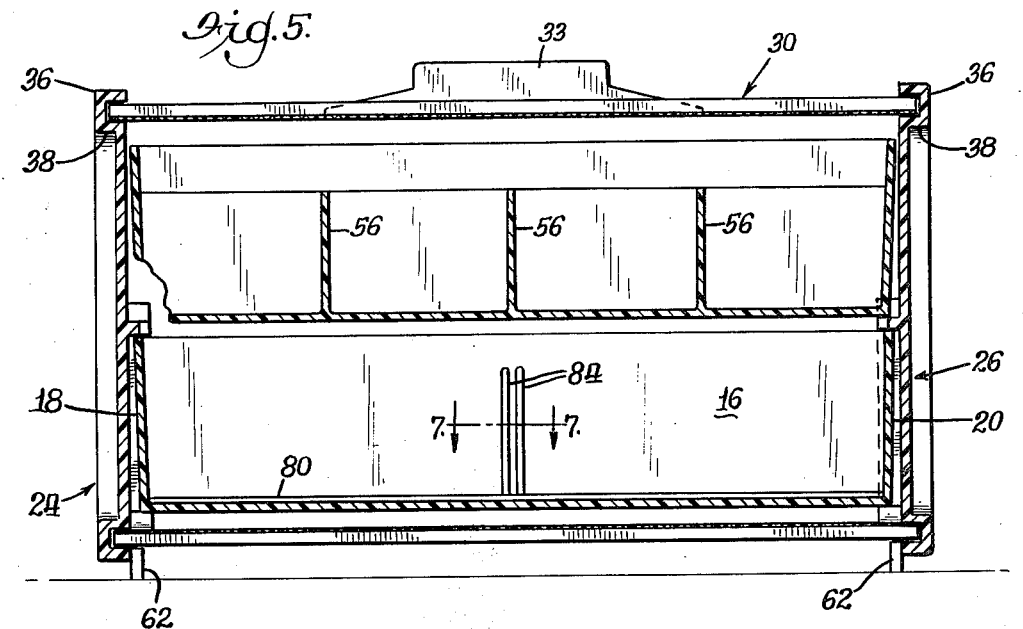
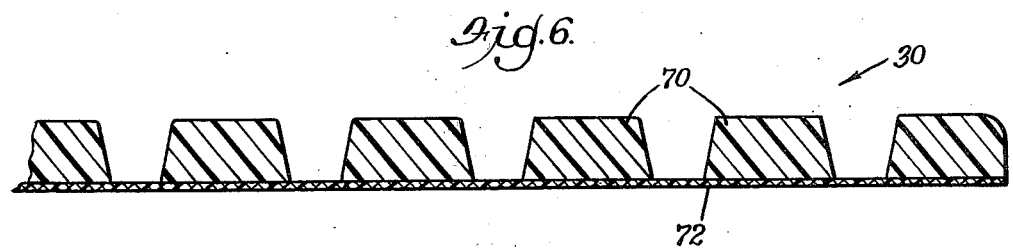
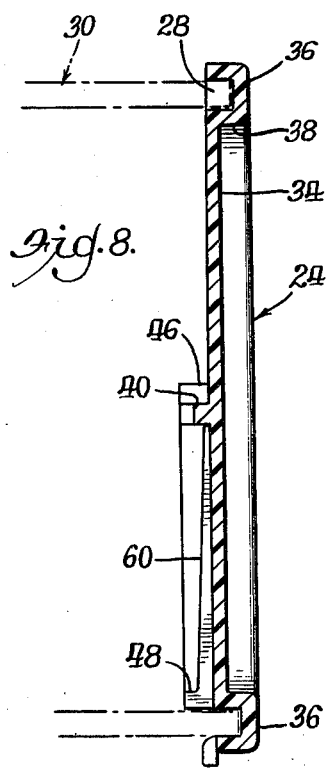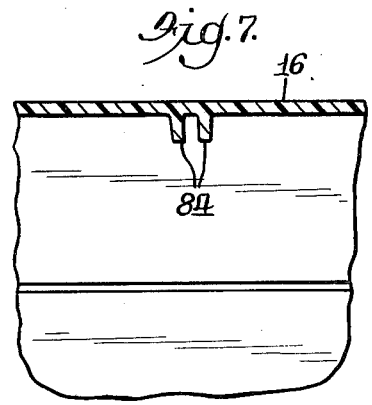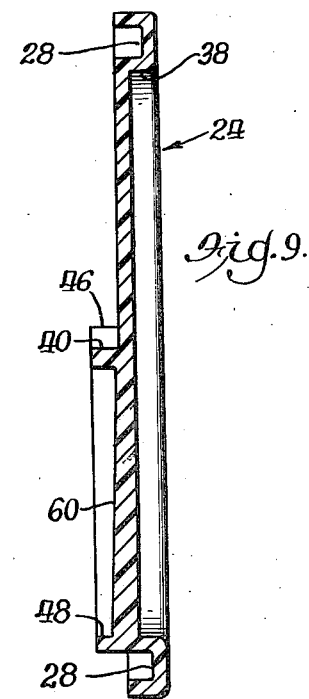

CONTAINER HAVING SLIDEABLE CLOSURE MEANS

The present invention generally relates to storage containers, and more particularly to smaller storage containers of the type which can store tabulating cards, magnetic tabulating cards, tape cassettes and the like.

There is a never ending need for efficient well designed containers for commercial use for storing such diverse items as tabulating cards, magnetic cards for use in office machines, magnetic tape cassettes as well as other office supplies with office dictating equipment or word processing equipment. This need also extends to the home, where attractive and functional containers are desired for storing such recipe cards, cassettes, sewing articles, as well as small hardware and other items. While many different kinds of containers have been manufactured, including compartmentalized boxes with removable covers and the like, a container that has a self-contained closure means that is normally not removed from the container when it is opened offers advantages in that the closure cannot be misplaced and does not occupy valuable space or otherwise clutter the area when it is removed. A container that is lightweight, yet strong and attractive and is capable of stacking is also desirable. Moreover, a container that has the dimensions and shape that is conducive to efficiently accommodating such diverse items as tape cassettes, tabulating cards, recipe cards as well as smaller items is also desirable.

Accordingly, it is an object of the present invention to provide a container having the above-mentioned desirable attributes as a result of its compact, efficient design which utilizes a sliding closure means that is contained within the container.

Another object of the present invention is to provide a container of the foregoing type which can be inexpensively manufactured due to its unique design which utilizes a small number of component parts.

Yet another object of the present invention is to provide a lightweight container which is unusually strong, due in part to the use of an integrally formed tray to which mirror image side panels are affixed, with the side panels having channels in which a slideable closure means is located.

Still another object of the present invention is to provide a container having a slideable closure means which, due to its design, is easily slideable in the cooperating channels, is strong and durable and is inexpensively fabricated.

Yet another object of the present invention is to provide a container wherein a removable tray can be positioned above the lower tray within the container wherein the two trays are of substantially identical outer proportion, thereby enabling a single outer mold portion to be used to form both trays.

Other objects and advantages will become apparent upon reading the following detailed description, while referring to the attached drawings, in which:

FIG. 5 is a cross section of the container and is taken generally along the line 5—5 of FIG. 2;

FIG. 6 is an enlarged cross section of a portion of the slideable closure means of the present invention and is taken generally along the line 6—6 of FIG. 1;

FIG. 7 is an enlarged cross section of a portion of the lower tray of the container and is taken generally along the line 7—7 of FIG. 5;

FIG. 8 is an enlarged cross section of one side panel of the container of the present invention and is taken generally along the line 8—8 of FIG. 2; and, FIG. 9 is an enlarged cross section of a side panel of the container of the present invention and is taken generally along the line 9—9 of FIG. 2.

Figure 1:
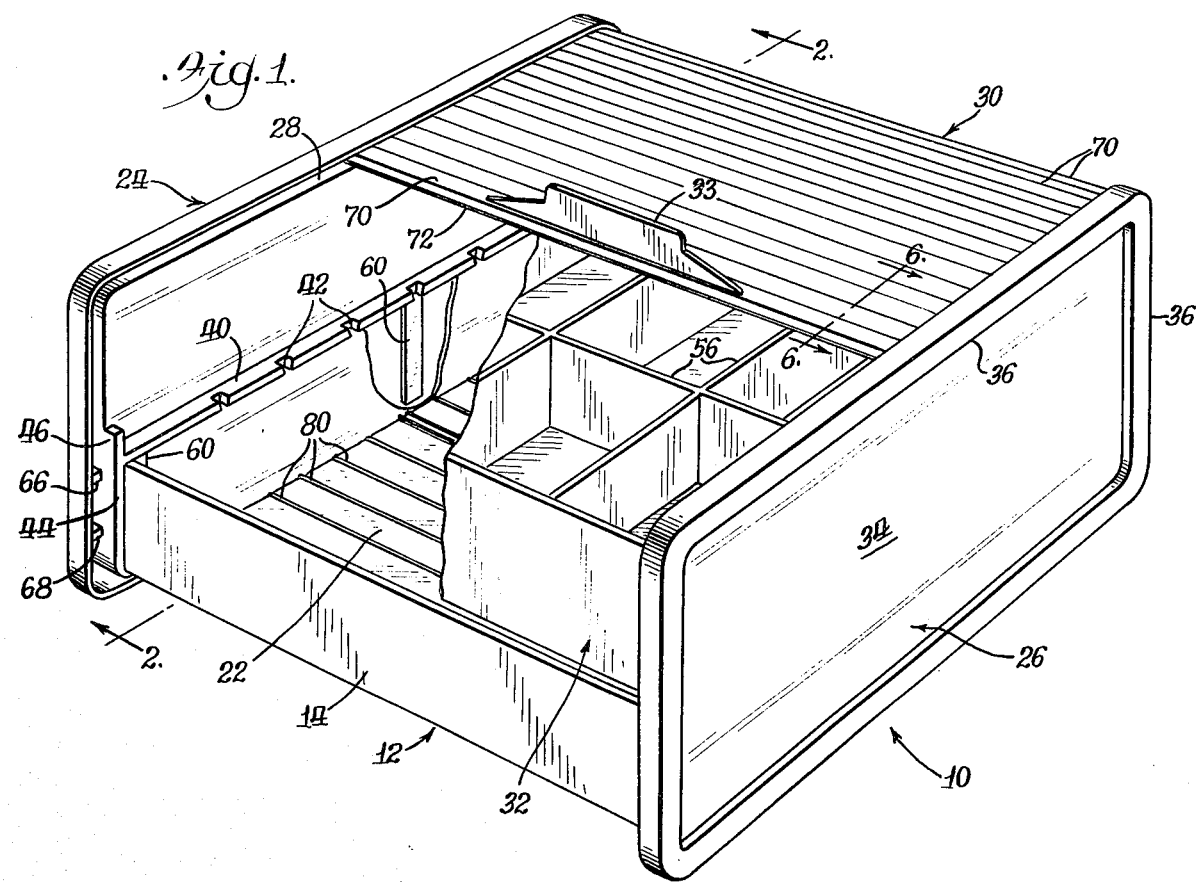
FIG. 1 is a perspective view, with portions broken away, of one embodiment of the container of the present invention.
Figure 2:
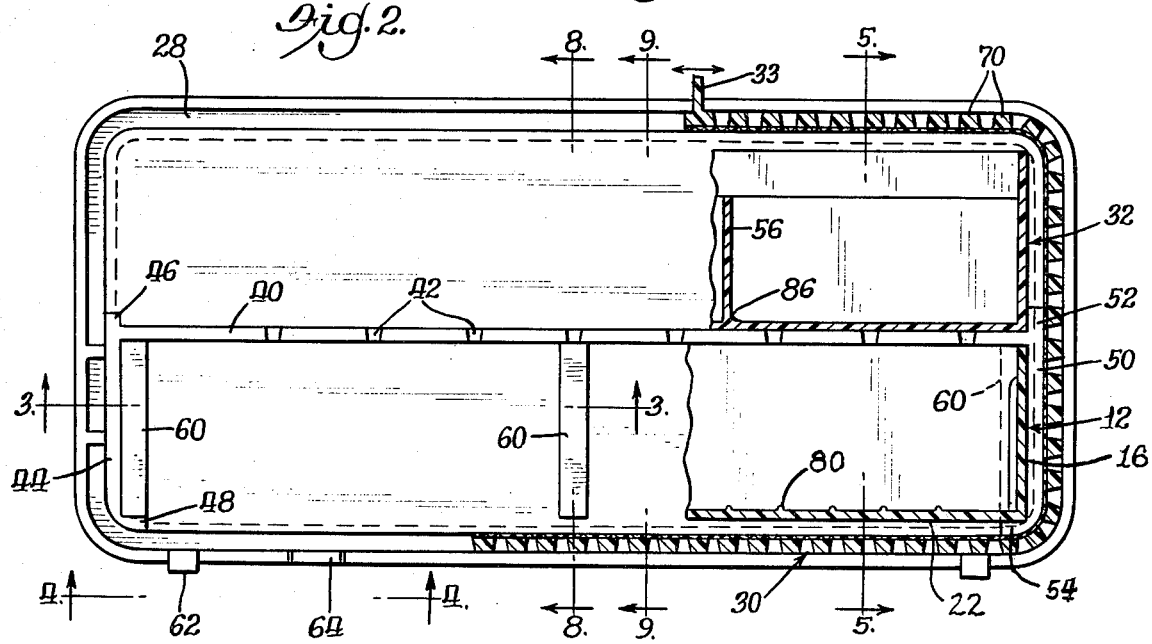
FIG. 2 is a cross section with portions broken away of the container shown in FIG. 1 and is taken generally along the line 2—2 thereof.
Figure 3:
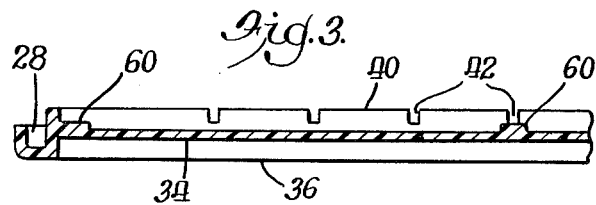
FIG. 3 is another cross section taken generally along the line 3—3 of FIG. 2 and particularly illustrating a portion of one side panel of the container of the present invention.

Turning now to the drawings and particularly FIGS. 1, 2 and 5, a container indicated generally at 10, is shown to comprise a lower tray portion, indicated generally at 12, which has a front wall 14, rear wall 16, side walls 18 and 20, as well as a bottom 22. The lower tray is preferably integrally formed of a plastic or plasticlike material and be structurally rigid, which is important because the lower tray portion 12 provides much of the structural rigidity for the entire container after it has been fabricated. A pair of side panels, indicated generally at 24 and 26, are attached to the lower tray 12 and each contains a channel 28 that extends substantially around the outer periphery thereof and the channels of the two side panels cooperatively receive a sliding closure means, indicated generally at 30, therein for closing the container. The closure member 30 has a length that enables it to extend across the top of the container between the front and back and also extend downwardly along both the front and the back portions to an elevation that is preferably below the top of the lower tray so as to completely close the container.

The container can have a removable upper tray, indicated generally at 32, which is preferably substantially identical in its outer shape and dimension as the lower tray 12. The upper tray is preferably seated on cooperative flanges of the side panels 24 and 26 and is easily removable from the front merely by raising the tray a small amount and sliding it forwardly out of the container. The closure means 30 is adapted to cover the upper tray when it is placed in the container and the closure will slide forwardly to a position where it is generally coextensive with the upper portion of the lower tray 14 with respect to both the front and the rear ends of the closure. Thus, the length of the closure 30 is such that it covers slightly more than ½ of the periphery of the container as viewed in FIG. 2, or stated in other words, more than about ½ of the length of the grooves 28. To facilitate movement of the closure, it is provided with a handle 33 which is preferably integrally formed with one of the end sections of the closure 30.

With respect to the more detailed construction of the container and referring to FIG. 2, the side panels 24 and 26 are essentially mirror images of one another and are adapted to be permanently bonded to the lower tray 12, and have the closure 30 inserted in the facing grooves of the side portion. As best shown in FIGS. 1, 2 and 5, each of the side panels 24 and 26 has a generally flat planar interior portion 34 and an outer raised extension 36 that is provided around the entire periphery of the side panel. The peripheral extension imports an esthetically pleasing appearance to the container and also provides a gripping surface 38 that facilitates easy pickup and handling of the container by an individual. As is best shown in FIGS. 8 and 9, the extension has a generally uniform thickness of material, i.e., generally of the same thickness as the flat portion 34 and the opposite side of the extension 36 defines the channel 28 in which the closure 30 is located.

As best shown in the perspective view of FIG. 1 and also in FIGS. 2, 5, 8 and 9, each of the side panels has a generally horizontal inwardly extending flange 40 that extends substantially the full length of the side panels and which provides several important functions for the container. Since the flange 40 is integrally formed with the side panel and is located generally midway between the upper and lower ends thereof, it provides an important function in that it structurally reinforces the side panels. Moreover, the upper surface of the flange 40 provides a flat surface for receiving the removable upper tray 32. The flange 40 also has a lower surface which is generally in abutting relation with the upper surface of the lower tray 12 which aids in strengthening the attachment of the side panels to the lower tray. As will be described herein, the lower tray is contained by the flange 40 together with vertical flanges located at the front and rear walls of the tray in addition to a lower support so that the tray fits within these four containing surfaces in close fitting relation. The flange 40 also contains a number of narrow notches 42 that are adapted to receive generally vertically oriented removable dividers for conveniently compartmentalizing the lower tray for retaining thin cards, such as recipe cards, magnetic cards, tabulating cards and the like.

The vertically oriented forward flange is shown at 44 and has an upwardly oriented extension 46 that extends above the horizontal flange 40 and provides a stop surface for retaining the upper tray 32 so that it will not slide out of the container without being lifted and thereby prevents its movement if the container is forwardly tipped, for example. The height of the extension 46 is preferably about ⅛ inch so that it does not present a significant impediment to the easy removal of the upper tray 32. The lower portion of the vertical extension 46 is shown to have a perpendicular extension 48 which provides the lower support for the tray 12. The construction of the other end of the side portion is similar and referring to FIG. 2, a vertically oriented flange 50 is provided which has an upper extension 52 that holds the removable tray from sliding rearwardly into contact with the closure 30 and also has the perpendicular extension 54 for supporting the lower tray in a manner similar to that described with respect to the perpendicular flange 48 on the front side. When the container is assembled, the tray 12 can be fitted into the side portions and the tray will snugly fit within the area defined by the lower extensions 48 and 54, the vertical flanges 44 and 50 and the horizontal flange 40.

As previously mentioned, it is convenient for the outer shape and size of the upper and lower trays 12 and 32 to be identical, for this permits a single outer mold to be used in forming each of the trays. In this regard, the cooperating component of the mold, i.e., the component of the mold that forms the inside surface may in fact comprise two or more interchangeable components, so that integrally formed compartmentalizing walls can be made if desired. In this regard, and referring to FIG. 1, it is shown that the lower tray is generally open, while the upper tray has a number of compartmentalizing walls 56 as shown. The outer configuration of both trays is such that the side walls are slightly angularly oriented to extend outwardly from the bottom to the top thereof to facilitate easy removal from the mold during manufacture. Since it is desired that the general plane of the side panels 24 and 26 be parallel to one another and perpendicular to the lower tray 12, the surfaces of the side portions 24 and 26 to which the lower tray 12 is bonded are provided with a corresponding angular inclination to compensate for the outward orientation of the side walls of the tray and thereby provides the desired parallel relationship of the side portions 24 and 26.

Since the overall size of the upper and lower trays are preferably identical, and since the upper tray is removable from the container, means are provided for bonding the lower tray to the side portions in a manner whereby adequate clearance is obtained which permits the upper tray to be easily removed. It should be appreciated that if the lower tray side walls were bonded to the inside walls of the side panels 34 and 36 without some means for spacing and assuming the thickness of the portion 34 is uniform across its entire area, then very little if any clearance would be present that would facilitate frictionless removal of the upper tray from the container.

Accordingly, a number of attachment pads, indicated generally at 60, are provided at spaced locations along the length of the side portions, as shown in FIGS. 1 and 2. While the number of such attachment pads is not critical, structural integrity is increased by located attachment pads 60 at the front, rear and at least one intermediate location, which is shown to be generally midway between the front and rear attachment pads. The attachment pads 60 are integrally formed with the side portions as best shown in FIG. 9 and have the proper angular orientation that compensates for the outwardly flared side walls of the tray so that the side portions are perpendicular to the general plane of the tray 12 in the resulting container. The attachment pads present flat surfaces for bonding to the side walls of the lower tray 12, which can be accomplished by conventional means, such as by bonding with a solvent that provides a chemical bond when the materials for the tray and side portions are of the same material. Alternatively, an adhesive or ultrasonic welding can be used with certain materials. In the present container, the side portions 24 and 26 as well as the trays are preferably fabricated from a styrene plastic and when this material is used, the solvent placed on one of the surfaces provides a strong bond when they are placed together. The use of styrene enables the container to be made in attractive colors, is resilient in that it can withstand physical stress and impact without easily breaking and is lightweight and strong. Of course, other suitable plastic or plastic-like materials can be used to make the side panels and trays if desired.

As best shown in FIGS. 2 and 5, each of the side panels 24 and 26 may have projections 62 located adjacent the opposite ends thereof which are located inwardly of the general plane of the flat surface 34 as shown. The projections serve as feet in the resulting container which space it from the floor and also permit containers to be stacked on one another in a manner whereby lateral or sideward movement relative to one another is prevented. The height of the feet 62 is preferably less than the thickness of the upper surface of the peripheral portion 36 so that the feet will not rest on the closure 30 when the units are stacked on one another.

Figure 4:
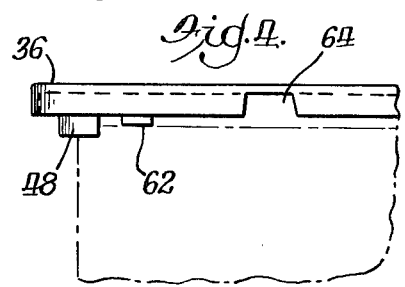
FIG. 4 is a bottom plan view of a portion of the side panel shown in FIG. 2.

As is shown in FIGS. 2 and 4, the channels 28 have a slot 64 located near the front portion of the underside thereof which enables the closure 30 to be inserted into the channel after the side panels have been bonded to the lower tray. Thus, the fabricator needs merely to grasp the closure 30 by the handle 33 and inserted into the slot 64 and slide the closure 30 within the channel until it is substantially closed at which time the opposite end of the closure 30 will be completely within the channel as is desired. A stop surface 66 is provided in each side panel in the channel 28 at the front as shown in FIG. 1 and limits the travel of the closure 30 when it is being closed, as the front edge of the closure will contact it when it moved to the fully closed position. Similarly, a stop surface 68 will stop the closure by contacting the opposite end of the same when the closure reaches the fully opened position.

Turning now to an important aspect of the present invention and referring to the enlarged cross section of a portion of the closure 30, there is shown a number of transverse ribs 70 that are preferably molded to a flexible fabriclike substrate 72. The desirable flexibility of the fabric enables the closure to be easily slid within the channel around the 90° corners during opening and closing of the same. More specifically, the ribs 70 are preferably molded of high impact polystyrene because it experiences virtually no sagging, flexes without breaking and bonds to the preferred substrate 72, other plastic or plasticlike materials can be used, provided that they may be adequately bonded to the substrate that is being used. The substrate 72 is preferably a non-woven fabric, commonly referred to as a spunbonded fabric material, such as Reemay manufactured by the duPont Company of Wilmington, Del. The Reemay fabric is believed to comprise two different polyesters, one having a melt point that is significantly higher than the other, with the different melt points contributing to the proper bonding of the ribs 70 thereto. In this regard, it is believed that one polyester comprising the bulk of the material in the fabric has a higher melt point of about 475° F. whereas the other polyester component, which may comprise only about 15% of the total, has a lower melt point. It is believed that the spunbonded material is formed by creating very thin filaments of the polyester material and impinging them into a surface at a very high velocity which causes them to create a fabric where the filaments are omnidirectional and they fuse together before hardening to provide an extremely strong, yet lightweight fabric. If the molding of the polystyrene ribs is carried out at a temperature that is higher than the melt point of the smaller proportion polyester component of the spunbonded fabric, then fusion can occur with that polyester component without affecting the structural integrity of the filaments of the other polyester and thereby substantially maintain the structural integrity of the overall fabric. The use of the spunbonded material greatly enhances the flexibility of the closure 30 and thereby permits the closure to easily slide within the channels, particularly around the corners thereof. Due to the design and construction of the closure means, i.e., the bonding of the ribs to the substrate, it is capable of being used in other applications, such as for window shades, decorative separators or as closures for larger or smaller containers, cabinets and the like where the desirable attributes of superior flexibility, attractiveness, strength and wearability are desired, and which are achieved at relatively low cost.

While the spunbonded fabric 72 is preferred, it should be appreciated that other fabrics, such as cloth or the like can be used if desired, provided that adequate bonding can be performed between the fabric and the molded ribs 70 without appreciably degrading the fabric in a manner that would shorten its useful life. It should also be understood that the use of the Reemay fabric is believed to have the advantage of permitting bonding to occur due to the fusion between the polyester component having a lower melt point, it may be sufficient for the material to merely encapsulate filaments of a single component polyester or even of a cloth fabric and that an adequate bond can be provided by the mere encapsulation or locking of the rib material around threads or filaments of the substrate. It should also be appreciated that a thin film that is generally continuous or solid may be used as a substrate if desired, it being understood that an adequate bond must be generated between the rib material and the substrate.

With respect to the use of the container, as previously mentioned, it may be used to store such diverse items as tabulating cards, magnetic cards, recipe cards and the like which, in such cases, would require the removal of the upper tray 32. The lower tray may conveniently retain magnetic tape cassettes and for this reason, a number of laterally extending ribs 80 are provided in the bottom of the lower tray 12 for the purpose of preventing tabulating cards or the like from slipping. In the event that cassettes are stored in the container, it is preferred that the width of the tray be such that it will hold cassettes on each side and if such is done, a central divider may be inserted in the lower tray extending from the rear wall to the front wall and for this reason, a pair of vertical spaced raised portions 84 may be provided to retain a dividing member therebetween. In this regard, the vertical raised portions 84 should be provided in the inside surface of the front and rear walls of the lower tray 12.

With respect to the upper tray, as previously mentioned, it may have the compartmentalizing interior walls 56 as shown in FIG. 1 and if such are provided, it is preferred that a front interface between the vertical and bottom surfaces be provided with a curvature 86 as shown in FIG. 2 to facilitate removal of small items that may be stored in the various compartments.

From the foregoing detailed description, it should be appreciated that an extremely compact, lightweight, strong and novel container has been shown and described which has much flexibility in terms of the kind and size of items that may be stored within it. The container is esthetically pleasing in appearance and has a sliding closure that is self-contained and is maintained within the overall boundaries of the container when in either an open or closed position which means that it will not be lost or be required to be placed at a separate location when access is desired to the container. The container is adapted to be easily stacked and stacking can be accomplished with the container either having its closure in an open or closed position. The use of the mirror image side panels with a integrally formed lower tray and the flexibility of using the removable upper tray means the entire closure can be fabricated from five components when the upper tray is included.

It is of course understood that although preferred embodiments of the present invention have been illustrated and described, various modifications, alternatives and equivalents thereof will become apparent to those skilled in the art and, accordingly, the scope of the present invention should be defined only by the appended claims and equivalents thereof.

Various features of the present invention are set forth in the following claims.

What is claimed is:

1. A storage container comprising:
   an integrally formed tray portion having bottom, front and rear walls and opposed side walls;
   side panels attached to the side walls of said tray, said side panels having an inwardly extending horizontal flange means located generally intermediate the top and bottom thereof, said panels having generally vertical flanges located along the front and rear thereof, said horizontal flanges being located closely adjacent the top of the respective side walls of said tray and said vertical flanges being located closely adjacent said front and rear walls of said tray so that the sides of said tray fit within said horizontal vertical flanges;
   each of said side panels having a channel along a substantial portion of the periphery thereof, said channels being opposed to one another and adapted to receive a sliding closure member therebetween;
   a closure member fitting in the channel of said opposite side panels, said member being generally rigid in the direction between said channels and flexible in the transverse direction so that said member is slideable in said channels and can be moved around the corners thereof to thereby open and close the container, said closure member being dimensioned so as to extend generally around approximately one half of the periphery of said container.

2. A container as defined in claim 1 wherein a second tray having an outer shape and dimensions substantially similar to the shape and dimensions of said tray portion is adapted to be seated within said container on said horizontal flanges, said second tray being capable of being located within said container when said closure member is closed.

3. A container as defined in claim 1 wherein said side panels have a number of integrally formed attachment pads for attachment to the side walls of said tray portion, said pads spacing the side panels from said tray portion side walls and providing surfaces for attachment thereto.

4. A container as defined in claim 3 wherein each of said side panels has attachment pads located near the front, rear and at an intermediate location.

5. A container as defined in claim 4 wherein the side walls of said tray portion diverge outwardly from the bottom to the top.

6. A container as defined in claim 5 wherein said attachment pads are vertically oriented and are thicker at the bottom portion to compensate for the outward divergence of said tray portion side walls so that the planes of said side panels are substantially parallel.

7. A container as defined in claim 4 wherein said side panels are bonded to said tray portion at the interface between said attachment pads and said tray portion side walls.

8. A container as defined in claim 1 wherein said closure member comprises a flexible substrate and a plurality of spaced elongated bars bonded thereto and extending between said side panels, said bars providing structural rigidity to said closure and the spaces between bars enabling flexing to occur.

9. A container as defined in claim 8 wherein said flexible substrate is a fabric composed of a multiplicity of randomly oriented filaments bonded together.

10. A container as defined in claim 1 wherein said horizontal flanges of said side panels have a number of opposed notches located along the length thereof adapted to receive removable separator members for separating said tray portion into compartments.

11. A container as defined in claim 1 wherein the bottom of each of said side panels has a slot therein through which said closure member can pass for inserting or removing said closure member within said channels.

12. Apparatus for use as a closure, separator or the like, having flexibility in one direction and being generally rigid in the transverse direction, said apparatus comprising a thin flexible substrate and a plurality of spaced elongated members molded onto said substrate, said substrate being comprised of a multiplicity of randomly oriented filaments bonded together, the members providing structural rigidity to said apparatus and the spaces between adjacent members permitting flexibility thereof.

13. Apparatus as defined in claim 12 wherein said substrate is comprised of two types of polyester filaments, the first type of which has a melt point higher than the melt point of the material of the elongated members that are molded onto said substrate, the second type of filaments having a melt point that is lower than the material of the elongated members so that said members are fused to said second type of filaments during molding of said members and not to said first type of filaments.

14. Apparatus as defined in claim 13 wherein said first type of filaments comprises a substantial majority of the filaments of said substrate.

15. Apparatus as defined in claim 14 wherein said first type of filaments comprises about 85% of the filaments of said fabric.

* * * * *